US 8,233,739 B1
Jul. 31, 2012

(12) United States Patent
Cho et al.

(10) Patent No.: US 8,233,739 B1
(45) Date of Patent: Jul. 31, 2012

(54) PATCH JITTERING FOR VISUAL ARTIFACT CORRECTION

(75) Inventors: Taeg Sang Cho, Cambridge, CA (US); Shmuel Avidan, Brookline, MA (US); William T. Freeman, Acton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 906 days.

(21) Appl. No.: 12/324,274

(22) Filed: Nov. 26, 2008

Related U.S. Application Data

(60) Provisional application No. 61/093,121, filed on Aug. 29, 2008.

(51) Int. Cl.
*G06K 9/36* (2006.01)
(52) U.S. Cl. ......... 382/276; 382/284; 382/286; 345/582
(58) Field of Classification Search .................. 345/582; 348/36; 382/162, 173, 232, 284, 298; 703/2
See application file for complete search history.

(56) References Cited

U.S. PATENT DOCUMENTS

| | | | | |
|---|---|---|---|---|
| 6,097,854 | A * | 8/2000 | Szeliski et al. | 382/284 |
| 6,263,103 | B1 * | 7/2001 | Freeman et al. | 382/173 |
| 6,910,000 | B1 * | 6/2005 | Yedidia et al. | 703/2 |
| 6,919,903 | B2 * | 7/2005 | Freeman et al. | 345/582 |
| 7,653,261 | B2 * | 1/2010 | Blake et al. | 382/284 |
| 7,747,107 | B2 * | 6/2010 | Avidan et al. | 382/298 |
| 7,899,258 | B2 * | 3/2011 | Liu et al. | 382/232 |
| 2008/0238942 | A1 | 10/2008 | Sun et al. | |
| 2009/0096808 | A1 | 4/2009 | Winn et al. | |
| 2010/0027876 | A1 * | 2/2010 | Avidan et al. | 382/162 |
| 2011/0043604 | A1 * | 2/2011 | Peleg et al. | 348/36 |

OTHER PUBLICATIONS

Cho, T. S., et al., "The patch transform and its applications to image editing," IEEE Conference on Computer Vision and Pattern Recognition, Jun. 23-28, 2008.*
Winder, S. A., et al. "Learning local image descriptors," IEEE Conference on Computer Vision and Pattern Recognition, Jun. 2007.*
Shai Avidan and Ariel Shamir. 2007. Seam carving for content-aware image resizing. In ACM SIGGRAPH 2007 papers (SIGGRAPH '07). ACM, New York, NY, USA, Article 10, 9 pages.
Efros, A., et al,. "Image Quilting for Content-Aware Image Resizing," ACM SIGGRAPH, 2007, all pages.

(Continued)

*Primary Examiner* — Vu Le
*Assistant Examiner* — Xuemei Chen
(74) *Attorney, Agent, or Firm* — Robert C. Kowert; Meyertons, Hood, Kivlin, Kowert & Goetzel, P.C.

(57) ABSTRACT

Systems and methods for performing image editing operations may use patch transforms and inverse patch transforms to reconstruct output images from input images and to refine them using patch jittering such that visual artifacts are repaired. The methods may include generating one or more jittered versions of patch(es) initially assigned to nodes of the output image and using them as candidate patches for a refined image. Jittered versions of patches may be shifted by a small number of pixels in one or more directions. The number of jittered versions and amount of jittering exhibited by each may be configurable (e.g., programmatically or by a user) and/or may be dependent on the amount of overlap between the patches. Belief propagation may be used to replace patches in the output image with jittered versions in the refined image. The methods may be implemented as program instructions executable on a CPU and/or GPU.

38 Claims, 10 Drawing Sheets

OTHER PUBLICATIONS

Cho, T.S., et al., "The Patch Transform," IEEE Trans. on Pattern Analysis and Machine Intelligence, vol. 32, No. 8, Aug. 2010, all pages.

E. D. Demaine and M. L. Demaine, "Jigsaw puzzles, edge matching, and polyomino packing: Connections and complexity," Graphs and Combinatorics, vol. 23, 2007, 14 pages.

D. Goldberg, C. Malon, and M. Bern, "A global approach to automatic solution of jigsaw puzzles," in Proceedings of Annual, Symposium on Computational Geometry, 2002, 10 pages.

M. G. Chung, M. M. Fleck, and D. A. Forsyth, "Jigsaw puzzle solver using shape and color," in Proceedings of International, Conference on Signal Processing, 1998, 4 pages.

H. C. da Gama Leitao and J. Stolfi, "A multiscale method for the reassembly of two-dimensional fragmented objects," IEEE, Transactions on Pattern Analysis and Machine Intelligence, vol. 24, No. 9, pp. 1239-1251, Sep. 2002.

L. Zhu, Z. Zhou, and D. Hu, "Globally consistent reconstruction of ripped-up documents," IEEE Transactions on Pattern Analysis, and Machine Intelligence, vol. 30, No. 1, pp. 1-13, 2008.

M. Brown and D. Lowe, "Recognising panoramas," in Proceedings of IEEE International Conference on Computer Vision (ICCV), 2003, 8 pages.

Marcelo Bertalmio, Guillermo Sapiro, Vincent Caselles, and Coloma Ballester. 2000. "Image inpainting." In Proceedings of the 27th annual conference on Computer graphics and interactive techniques (SIGGRAPH '00). ACM Press/Addison-Wesley Publishing Co., New York, NY, USA, pp. 417-424.

A. Criminisi, P. P'erez, and K. Toyama, "Region filling and object removal by exemplar-based image inpainting," IEEE Transactions on Image Processing, 2004, 13 pages.

A. A. Efros and T. K. Leung, "Texture synthesis by non-parametric sampling," in Proceedings of IEEE International Conference on Computer Vision (ICCV), 1999, 6 pages.

W. T. Freeman, E. C. Pasztor, and O. T. Carmichael, "Learning low-level vision," International Journal of Computer Vision (IJCV), vol. 40, No. 1, pp. 25-47, 2000.

V. Kwatra, A. Sch odl, I. Essa, G. Turk, and A. Bobick, "Graphcut textures: image and video synthesis using graph cuts," in ACM Transactions on Graphics (SIGGRAPH), 2003, 10 pages.

N. Komodakis and G. Tziritas, "Image completion using efficient belief propagation via priority scheduling and dynamic pruning," IEEE Transations on Image Processing, vol. 16, No. 11, pp. 2649-2661, Nov. 2007.

U.S. Appl. No. 12/324,319, filed Nov. 26, 2008, all pages.

* cited by examiner

PATCH JITTERING FOR VISUAL ARTIFACT CORRECTION

PRIORITY INFORMATION

This application claims benefit of priority of U.S. Provisional Application Ser. No. 61/093,121 entitled "Patch Jittering for Visual Artifact Correction" filed Aug. 29, 2008, the content of which is incorporated by reference herein in its entirety.

BACKGROUND

Description of the Related Art

Graphic applications include an ever-increasing number of image editing features, such as various filtering options, image feature relocation operations, and resizing operations (e.g., for cropping, expanding, or reducing an image). A user may want to make various changes to an image, such as changes in the position of objects, or changes to textures. These types of changes can be difficult to make using existing editing tools.

Some previous techniques on image matting and image composition work at a pixel-level accuracy, and have been shown to perform well in extracting foreground layers in images and placing them on a new background. However, these techniques are computationally complex and consume large amounts of both time and resources. In addition, they typically require the user to provide very accurate inputs to drive construction of a new output image.

Patch-based image representations have been introduced in literature in the form of "epitomes" and "jigsaws." In these models, an image is represented by a small source image and a transformation map. While these models can generate an image with overlapping patches from a source image, they are applied primarily for image analysis.

Generating an image from patches (i.e. stitching patches together to synthesize new images, to perform hole filling, image re-organization and/or image retargeting) is closely related to solving jigsaw puzzles. Some types of jigsaw puzzles have been shown to be NP-complete because they can be reduced to the Set Partition Problem. Nevertheless, there has been much work in literature to (approximately) solve the problem, and for jigsaws with discriminative shapes, it can be proven that a polynomial algorithm solves the puzzle. In a shape-based approach, the boundary shape of the jigsaw is used to find valid neighbors. Using this approach, even if valid neighbors can be found using shape, the problem is still NP-complete because finding the correct order of the boundary jigsaws can be reduced to the traveling salesman problem. Other scientific problems have been formulated as solving a jigsaw puzzle as well, including reconstructing a relic from its fragments, fitting a protein with known amino acid sequence to a 3D electron density map, reconstructing a document from its fragments, and reconstructing a speech signal from its scrambles.

SUMMARY

Systems and methods for performing image editing operations may use patch transforms and inverse patch transforms to reconstruct output images from input images such that visual artifacts are minimized. For example, patch transforms may in some embodiments be employed in an image editing operation that includes adding a patch to the image, relocating a patch within the image, removing a patch from the image, filling a hole in the image resulting from relocation of a patch, or filling a hole in the image resulting from removal of a patch. The methods may include dividing an input image into patches (e.g., according to a regular grid) and assigning those patches to locations (nodes) in the reconstructed output image, as described in more detail herein.

In some embodiments, some or all of the patches are overlapping patches, and these patches may be jittered to correct visual artifacts in the reconstructed output image. One or more jittered versions of a patch initially assigned to a node in the output image may be generated and included in a set of candidate patches to be assigned to the corresponding node in a refined output image. A jittered version of a patch may be a version of the patch that has been shifted by a small number of pixels in a horizontal and/or vertical direction. In some embodiments, the amount of jittering exhibited by each jittered version of a given patch and/or the number of jittered versions of the given patch to be generated and/or considered for placement in the refined image may be configurable (e.g., programmatically, or by a user). In other embodiments, the amount of jitter exhibited by the jittered versions of a given patch may be dependent on the amount of overlap between the given patch and an adjacent patch in the output image. In some embodiments, one or more jittered versions of each patch of an image may be pre-computed (e.g., prior to or in response to an image editing operation), and may subsequently be used in correcting of visual artifacts.

In some embodiments, belief propagation may be used to determine a correction solution in which one of the jittered versions of one or more patches initially assigned to various nodes in the output image replace corresponding nodes in a refined output image such that the joint probability of active label assignments is maximized and visual artifacts are repaired.

Patch jittering may in some embodiments be applied to one or more regions of a reconstructed output image to repair visual artifacts. In some embodiments, one or more regions containing visual artifacts may be identified by a user (e.g., they may be selected using a graphical user interface) and may be operated on using patch jittering to repair the visual artifacts. In other embodiments, patch jittering may be applied to an entire output image, one region at a time (e.g., by applying patch jittering serially to regions corresponding to a sliding window, by horizontal or vertical strips of the image, etc.), or to two or more regions in parallel.

The methods described herein may be implemented as program instructions, (e.g., stored on computer-readable storage media) executable by a CPU and/or GPU, in various embodiments. For example, they may be implemented as program instructions that, when executed, implement an image editing application in response to user input. This image editing application may perform image editing operations using inverse patch transforms, thus generating reconstructed output images, and may perform correction of visual artifacts in the output image using patch jittering, as described herein. The selection of particular image editing operations or correction operations to be applied to an image (and/or parameters thereof) may be specified by the user (e.g., through a graphical user interface).

Figure 1A:
FIG. 1A illustrates an input image to a graphics application, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, graphic applications include an ever-increasing number of image editing features, such as various filtering options, image feature relocation operations, and resizing operations (e.g., for cropping, expanding, or reducing an image or individual features thereof). In some embodiments, an image representation called a "patch transform" may allow users to manipulate images in the "patch domain", which may then seed an "inverse patch transform" to synthesize a modified image. The patch transform of an image may in some embodiments be computed by sampling overlapping patches on a regular grid, and representing them as a "bag-of-patches". Possible modifications in the patch domain may include changes in the spatial locations of patches, the size of the output image, or the pool of patches from which an image is reconstructed. The inverse patch transform may in some embodiments be posed as a patch assignment problem on a Markov random field (MRF), in which each patch should be used only once, and neighboring patches should fit to form a plausible image. An approximate solution to the MRF may be found using loopy belief propagation (BP), and may include the application of a patch exclusion constraint. When no modifications are made, the inverse patch transform may be reduced to a transform similar to solving a jigsaw puzzle. In some embodiments, various image editing tasks may leverage the characteristics of the patch transform.

Image editing tasks that leverage the patch transform may be well suited for application to natural images, such as that shown in FIG. 1A. This image looks natural because the scene context is correct. The sky is at the top, the ground is at the bottom, and the arrangement of object meets standard geometrical constraints, such as the perspective projection. In some embodiments, other natural-looking images may be generated using the pixels of this image. For example, if two pixels, one belonging to the grass and the other belonging to the tree leaf, are swapped, and all other pixels remain fixed, the image may still be perceived as natural looking. In some embodiments, characteristic of natural images may be leveraged in making modifications to an image.

For example, to reposition the woman in FIG. 1A, the image of the woman must be selected, it must be moved to a new location, it must be blended into the new location's surroundings, and then the region that it used to occlude must be filled in through texture synthesis and/or image in-painting. Even after these steps, the image might not look right. For example, the pixels over which the image of the woman has been moved are lost, and the image of the woman may not fit well in its new surroundings. In addition, filled-in textures may change the balance of textures from that of the original image, though the user may have preferred that the original balance be maintained.

Figure 1B:
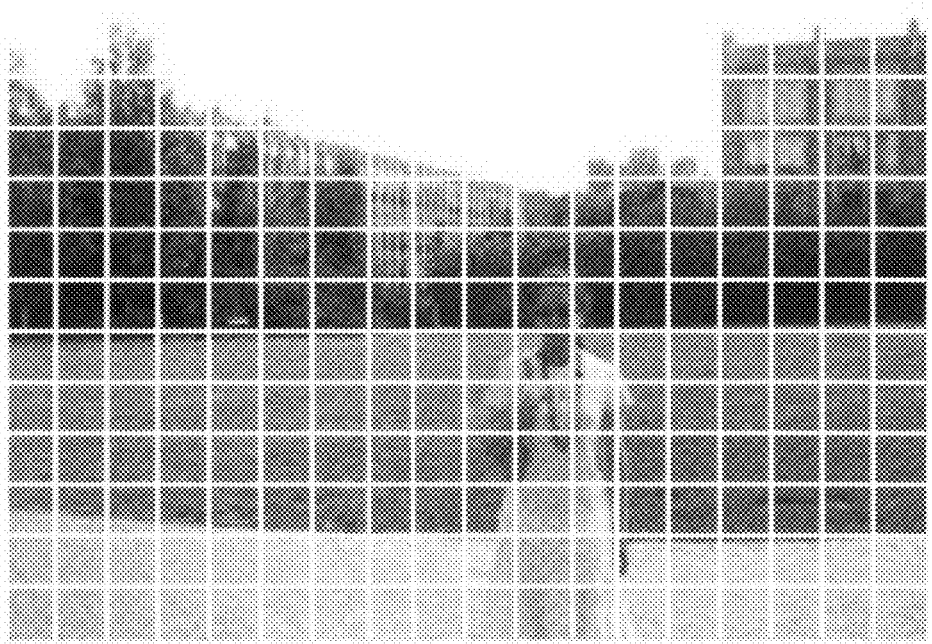
FIG. 1B illustrates an input image divided into patches on a regular grid, according to one embodiment.

In an ideal scenario, a user might be able to "draw" the desired image, with the aid of an editing tool, using all the pixels in the input image only once. The benefit of this approach would be that the problem of changing the balance between textures may be trivially eliminated, and the need for filling in the regions that the foreground object occluded would not exist. Ideally, the user would specify only the desired changes, and would let the editing tool adjust other pixels as to make the entire image as natural as possible. However, such an approach would necessitate that the editing tool be able to assign millions of pixels values to millions of pixel "locations", which could be computationally intractable for large images. In some embodiments, editing operations that make use of a patch transform may strike a balance between flexibility in editing capability and available computational power. In such embodiments, an image may be represented as a set of overlapping patches sampled on a regular grid, and each patch may be treated as an element of the image. For example, for an input image having a size of 736×976 pixels, the size of a patch may 76×76 pixels, with 16 pixels of overlap in all four directions. This would break up the image into 192 patches. FIG. 1B illustrates the scene depicted in FIG. 1A, including a regular grid. Each patch of this image may include the pixels enclosed by one of the grid squares along with a number of pixels overlapping the grid square on all sides. As noted above, the patch representation of an image may be referred to as the patch transform of the image.

Drawing an image from its patch transform may be referred to as the inverse patch transform. Conceptually, the inverse patch transform may be thought of as solving a jigsaw puzzle while conforming to user specified modifications. When no user constraints are specified, the inverse patch transform reduces to solving a jigsaw puzzle. The inverse patch transform may in some embodiments be solved by formulating a Markov random field (MRF) on the patch "slots", and using loopy belief propagation to solve for the patch label at each patch slot.

In various embodiments, the factors that are considered when solving for the inverse patch transform may include: (i) neighboring patches should be compatible to one another so that visible artifacts may be minimized (ii) each patch should be used only once in generating the output image. The compatibility between two overlapping patches may in some embodiments be defined in terms of seam energy, as described herein. To handle the second constraint, named the exclusion constraint, the grid MRF may in some embodiments be augmented with a factor node that steers the solution to use each patch only once.

The patch transform may enable users to manipulate an image in the "patch domain." In various embodiments, users may constrain patch positions, add patches, or remove patches from the image, just as if manipulating pixels. Such a characteristic may give rise to many useful image editing operations. For example, in some embodiments, the user may be able to easily relocate objects in an image by specifying the desired location of certain patches. In another example, the user may be able to easily "retarget" an image by specifying the desired size of the image. Alternatively, the user may be able to modify the amount of texture in an image by adding or removing patches that belong to a particular class (e.g., the sky or clouds). The user may also be able to mix patches from multiple images to generate a collage of those patches, in some embodiments.

As described herein, a patch transform representation may be generated by sampling overlapping patches from the grid, rather than by sampling non-overlapping patches, as in some previous approaches to image reconstruction. The use of overlapping patches may enhance the compatibility measure of the patches and/or reduce visual artifacts in modified images. In some embodiments, the running time of the algorithm may be significantly reduced by pruning the patch candidates at each image node prior to performing an editing operation and/or early in the inference stage.

As previously noted, previous techniques on image matting and image composition work at a pixel-level accuracy, and may perform well in extracting foreground layers in images and placing them on a new background, thus avoiding the tasks of hole filling, image reorganization, or image retargeting. The patch transform approach, on the other hand, inherently works with patch-level accuracy. Therefore, the patch transform approach may not require the user to provide very accurate input, but may adjust the image to the user input so as to make the output image as natural as possible. The patch transform may in some embodiments be used in performing hole filling, image re-organization and/or image retargeting, in addition to accommodating user input, providing a flexible framework for multiple image editing tasks. Using the patch transform, a user may not need to be concerned about the pixels over which an object will be moved, since those underlying patches will "get out of the way" and reposition themselves elsewhere in the image during the image reconstruction step. In various embodiments, a patch transform and/or inverse patch transform may be used in stitching patches together to synthesize new images. In some embodiments, in contrast to typical texture synthesis methods, the patch transform approach may include an exclusivity constraint, i.e., a constraint against multiple uses of a single patch. This may facilitate the controlled rearrangement of an image.

As previously noted, an image editing framework may in some embodiments leverage the patch transform. For example, given an input image, the front end of the system may sample overlapping patches from a regular grid, each with the same size and the same amount of overlap. Once the patches are sampled, the system may compute the compatibility among all possible pairs of patches, and may allow a user to specify desired changes to the input image.

The system may use the inverse patch transform to reconstruct an image, given the user input, by first formulating an MRF, in which nodes represent spatial positions at which the patches will be placed. These nodes may be referred to as "image nodes". The inverse patch transform may run loopy belief propagation on the MRF to solve for patch assignments that are visually pleasing, while satisfying user inputs.

A method for applying a patch transform to image modification may in various embodiments include a pre-processing operation to divide an input image into overlapping patches based on a regular grid and compute the compatibility of various pairs of patches. In some embodiments, the compatibility may be determined by determining the similarity between two patches along a most similar seam of slightly (or heavily) overlapping patches. In this way, image boundaries within patches may be better respected than they would be using an approach that stitches together non-overlapping patches.

The method may also include receiving user input regarding a modification to make on the image (e.g., identifying an object to be moved, a portion of the image to be fixed in place, an object to be removed, etc.). The method may include applying belief propagation to perform an initial reconstruction of the image based on the user input and/or any other local evidence (e.g., the sky is at the top of the image, the grass is at the bottom), and to continue processing the reconstructed image until a visually pleasing result is obtained. Specifically, belief propagation may be used to model the probability of each of the possible assignments of patches to output image nodes. Solving the joint probability equation may then result in the assignment of each patch included in the output image to its respective location in the output image. As described below, in some embodiments the belief propagation equation to be solved may include the product of three terms: a first term specifying local evidence (including user inputs), a second term that represents the similarity of two patches if they are placed next to each other, and a third term (the exclusivity term) that is used to detect and attempt to resolve conflicts between patch assignments.

The method may include, for each image location, a determination of patches that may be suitable for assignment to that location and/or its neighbors. As described in more detail below, each image node (e.g., a reference node) may send messages to its neighbors (e.g., its four nearest neighbors, those on the top, bottom, left, and right of the node) indicating the patches it has determined to be suitable for them (i.e., the labels or identifiers of patches recommended for assignment to the neighbors). Similarly, the neighbor nodes may send messages to the reference node indicating the patch(es) that they have determined may be suitable for placement at the reference node location. The BP algorithm may be applied iteratively to each image node to adjust its recommendations based on the input from its neighbors and vice versa, while taking into account any local evidence for the reference node, until some level of convergence is achieved.

The exclusivity term, described in more detail below, may steer the solution toward one in which each patch is used only once in the output image. For example, in various embodiments, at each time step of the BP iterations (i.e., the message passing), the messages from all of the image nodes may be compared, and conflicts may be detected (e.g., if two image locations have requested the same patch label). The exclusivity term may be used to give preference to the image node with the highest compatibility score, and may assign the competing image nodes a score of zero, thus steering the result so that the patch of interest is only assigned to the most compatible image location and no others. Without such an exclusivity term, the BP algorithm may be steered to a solution that includes any number of duplicates of one or more patches. For example, without such a term, for an input image that includes a blue sky portion, the entire output image may be tiled using patches of blue sky, since these patches would all be compatible with each other, and the local evidence of many of the patches would include blue sky.

Once patches are assigned to image nodes, the patches may be stitched together. In one embodiment, each image node may be visited in a rasterized manner, and at each image node, the assigned patch may be stitched to the blended image thus far by finding the seam that results in minimum artifacts. The stitched image may still contain artifacts due to luminance difference if two adjacent patches were not adjacent in the original image. Thus, the intensity gradients along the seam may be removed if two patches that generated the seam were not adjacent in the original image. In some embodiments, a Poisson solver may be used to generate an image with suppressed seam artifacts. The image model and inverse patch transform are described in more detail below.

In one embodiment, the unknown state at the $i^{th}$ image node may be the index of the patch $x_i$ to be placed at that position. Based on how plausibly one patch fits next to another, a compatibility, $\psi$, may be defined. Each image node may have four neighbors (except at the image boundary). The compatibility between patch k and patch l, placed at neighboring image positions i and j, may be represented as $\psi_{i,j}(k, l)$. In this example, the position subscripts i, j in the function $\psi_{i,j}$ may be used to keep track of which of the four neighbor relationships of j relative to i is being referred to (up, down, left, or right).

In this example, let x be a vector of the unknown patch indices $x_i$ at each of the N image positions i. The probability of an assignment, x, of patches to image positions may be defined as:

$$P(x) \propto \left\{ \prod_i \phi_i(x_i) \prod_{j \in N(i)} \psi_{ij}(x_i, x_j) \right\} E(x) \quad (1)$$

A "patch exclusion" function, E(x), in this example, is zero if any two elements of x are the same (i.e., if any patch is used more than once) and is otherwise one. User constraints on patch positions are represented by a local evidence term, $\phi_i(x_i)$, in this example. In some embodiments, the local evidence term may include, for each patch, the mean intensity of the pixels in the patch. In other embodiments, the local evidence term may include other information relative to the patch and/or its context. The term $\phi_i(x_i)$ may also be used to aid the image reconstruction, as described later.

By maximizing P(x), a solution may be realized that matches compatible patches locally, while ensuring that each patch is used only once. As described in more detail below, a message passing scheme may be used to find the patch assignment x that approximately maximizes P(x) in Eq. (1).

Finding the assignment x that maximizes P(x) in the MRF of Eq. (1) is NP-hard, but approximate methods may in some embodiments yield good results. One such method is belief propagation. Belief propagation is an exact inference algorithm for Markov networks without loops, but in some embodiments, it may give good results even in networks with loops. For belief propagation applied in networks with loops, different factorizations of the MRF joint probability may lead to different results. In some embodiments, the patch assignments may be solved using an alternative factorization of Eq. (1) as a directed graph.

To derive a directed graph image model, a normalized compatibility may be defined as:

$$p_{i,j}(x_i \mid x_j) = \frac{\psi_{i,j}(x_i, x_j)}{\sum_{i=1}^{M} \psi_{i,j}(x_i, x_j)} \quad (2)$$

In this example, the local evidence term may be defined as $p(y_i|x_i) = \phi_i(x_i) d$. The joint probability of Eq. (1) in terms of conditional probabilities may be defined as:

$$P(x) \propto \prod_{i=1}^{N} \prod_{j \in N(i)} p(y_i \mid x_i) p_{i,j}(x_j \mid x_i) p(x_i) E(x) \quad (3)$$

In this example, N(i) represents the neighboring indices of $x_i$, $y_i$ represents the patch at location i in the original image, and $p_{i,j}$ represents the appropriate normalized compatibility determined by the relative location of j with respect to i. In some embodiments, $p(x_i)$ may be manipulated to steer the MRF to favor patches with certain characteristics, while in other embodiments $p(x_i)$ may be modeled as a uniform distribution.

The approximate marginal probability at node i may in some embodiments be computed by iterating the message passing scheme until convergence is achieved. Ignoring the exclusion term E(x), the message update rules for this factorization may be as follows. If j is in the neighborhood of I, then the message from j to i is defined as:

$$m_{ji}(x_i) \propto \sum_{x_j} p_{i,j}(x_i \mid x_j) p(y_j \mid x_j) \prod_{l \in N(j) \setminus i} m_{lj}(x_j) \qquad (4)$$

In this example, the patch assignment at node i may be defined as:

$$\hat{x}_i = \operatorname*{argmax}_l b_i \ (x_i = l) \qquad (5)$$

The belief at node i may be defined as follows:

$$b_i(x_i) = p(y_i \mid x_i) \prod_{j \in N(i)} m_{ji}(x_i) \qquad (6)$$

The message passing scheme described above may fail to reconstruct the original image by using each patch more than once. In some embodiments, a message passing scheme that integrates the exclusion term may be employed, and may favor a solution that seldom uses each patch more than once.

Since the exclusion term is a global function involving all $x_i$, it may be represented as a factor node that is connected to every image node i. The message from the node i to the factor ($m_{if}$) can be shown to be the belief $b_i(x_i)$, as in Eq. (6), and the message from the factor to the node i may be computed as follows:

$$m_{fi}(x_i) = \sum_{\{x_1,\ldots,x_N\} \setminus x_i} \psi_F(x_1, \ldots, x_N) \prod_{t \in S \setminus i} m_{tf}(x_t) \qquad (7)$$

In this example, S is the set of all image nodes. If any of the two nodes in S share the same patch, $\psi_F(\cdot)$ is zero, otherwise it is one. The message computation may involve marginalizing N−1 state variables (i.e. the image nodes) that can take on M different values (i.e. the number of patches), so the complexity of the marginalization operation becomes $O(M^{(N-1)})$, which is intractable.

An approximate solution to Eq. (7) may be found, in some embodiments. Instead of marginalizing variables over a joint potential $\psi_F(x_1, \ldots, x_N)$, an approximation of $\psi_F(x_1, \ldots, x_N)$ may be computed as a product of pair-wise exclusion potentials. For computing the message from the exclusion factor node to an image node i, $$\psi_{F_i}(x_1, \ldots, x_N) \approx \prod_{t \in S \setminus i} \psi_{F_t}(x_t \mid x_i) \qquad (8)$$

where $$\psi_F(x_j \mid x_i) = 1 - \delta(x_j - x_i) \qquad (9)$$

The full joint potential $\psi_F(x_1, \ldots, x_N)$ may in some embodiments be zero even if the patch to be placed at node i is not being shared with other image nodes if two other nodes, e.g., u,w∈S, share the same patch. However, the product of pair-wise exclusion potential $\prod_{t \in S \setminus i} \psi_{F_t}(x_t \mid x_i)$ is zero only if the patch to be assigned to node i has already been used by another image node. Combining Eq. (7-9) results in the following:

$$m_{fi}(x_i = l) \approx \prod_{t \in S \setminus i} \sum_{x_t=1}^{M} \psi_{F_t(x_t \mid x_i = l)} m_{tf}(x_t) = \prod_{t \in S \setminus i} (1 - m_{tf}(x_t = l)) \qquad (10)$$

In this example, it is assumed that $m_{tf}$ is normalized to 1. In other words, the exclusion factor node f tells the node i to place low probability on claiming patch l if patch l has already been claimed by another node with a high probability, and is intuitively satisfying.

In some embodiments, to stabilize BP, the message at iteration t+1 may be damped by taking the geometric mean of the messages at iteration t and t−1.

As previously noted, in previous approaches, patches may be assumed to be non-overlapping and, accordingly, their compatibility is defined in terms of natural image statistics prior. While the compatibility may be reliable in most cases, non-overlapping patches may result in visual artifacts when tiled next to another. By contrast, the patch transform approach described herein may include overlapping patches and may use seams for stitching the patches together. This may in various embodiments results in fewer visual artifacts. Specifically, a compatibility function may be defined that assigns high compatibility to a pair of patches that can be placed next to each other with little or no visible artifacts. In some embodiments, the patches are stitched together along the seam that minimizes visible artifacts, and the seam energy may be used in computing the compatibility function.

Figure 2:
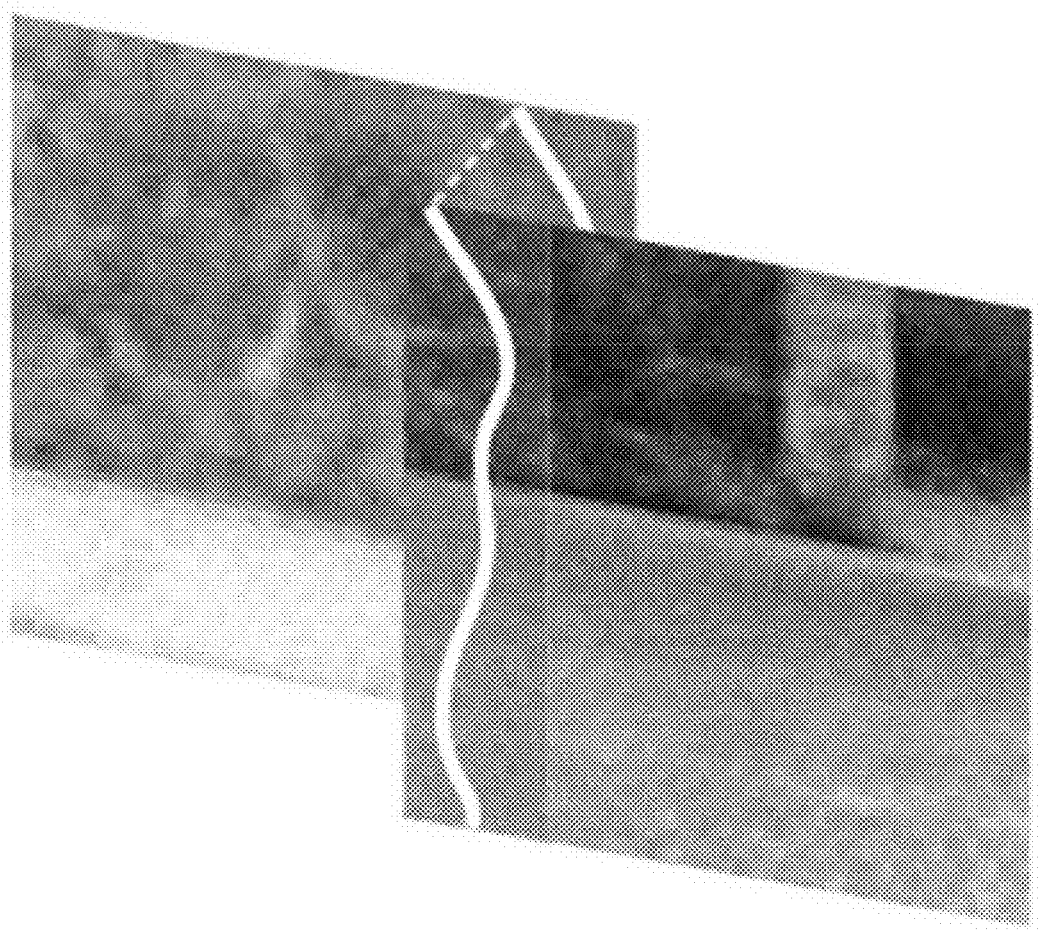
FIG. 2 illustrates a seam between two overlapping patches, according to various embodiments.

FIG. 2 illustrates the computation of the left-right seam energy for two overlapping patches, k and l, according to one embodiment. In this example, the method may include finding the seam, within the overlapped region, along which the color difference between the two patches is minimum. In some embodiments dynamic programming may be used to find the optimal seam. The color difference along the optimal seam may be defined as the seam energy $E_{seam}(k, l)$, which may be exponentiated to compute the compatibility $\psi$ as follows:

$$\psi_{i,j}(k, l) \propto \exp\left(-\frac{E_{seam}(k, l)}{\sigma_c^2}\right) \qquad (11)$$

In this example, $\sigma_c$ is a parameter that controls how much finite seam energy in penalized. One notable characteristic of $E_{seam}$ is that it is zero for two patches that are adjacent in the original image. For any given patch, the compatibility is the highest with the patch that was adjacent to it in the original image. This characteristic allows a greedy polynomial-time algorithm to reconstruct the original image. However, such a greedy algorithm may not generalize well to accommodate image editing operations, as an MRF based algorithm does.

In some embodiments, $\sigma_c$ in Eq. (11) may be the same for all pairs of patches, and may be set by hand. In other embodiments, $\sigma_c$ may be set differently for every patch pair. To determine $\sigma_c$ for patch l, for example, $E_{seam}(k, l)$ may be computed for all patches k. In this example, $E^*_{seam}(k)$ may be defined as a sorted array of $E_{seam}(k\,l)$ along the dimension of k in an ascending manner. Then $\sigma_c$ may be computed for patch/as follows:

$$\sigma_c = E_{seam}^*(2) - E_{seam}^*(1) \tag{12}$$

This definition may leave only few patches to be compatible to the reference patch l, as the normalized compatibility $p_{i,j}(k|l)$ is high for only few patches k. This may tend to shape the optimization function (Eq. (1)) to have a wide peak around the maximum.

The computational complexity of the sum-product belief propagation algorithm is O(NMK), where N is the number of image nodes, M is the number of possible patch labels at each image node, and K is the number of possible candidate patches that can be placed next to another patch. If L represents the total number of patches from an image, typically N=M=K=L for all editing applications other than image retargeting (in which case N≦M, K=L), resulting in the complexity of $O(L^3)$ or $O(NL^2)$.

The contribution of the local evidence and the exclusion terms may be described by way of examples that include neither, one, or both of these terms. Without the local evidence or the exclusion term, the belief propagation (BP) will rely solely on the pair-wise compatibilities to reconstruct the original image. Therefore, while the reconstructed image may not look like the original image, BP may do a good job in placing compatible patches next to one another. In other words, while BP may be good at placing compatible patches next to each other, it may not be good at steering the solution to have the same structure as the original image. In this example, the image model with only compatibility terms may have many local maxima. Therefore, each time the BP messages are randomly initialized, BP may end up with a different reconstructed image. In addition, it may take many message passing iterations for the solution to converge.

In an embodiment that includes local evidence, but not the exclusion term, the local evidence may specify where the user wants to locate specified patches. In this example, if a patch l is fixed at node i as a user input, $p(y_i|x_i)$ is 1 for $x_i=l$ and 0 otherwise. To facilitate the image reconstruction, the local evidence term may be shared with the user input. In this example, a low resolution version of the original image may be used to keep the structure of the original image (i.e. place bright patches at the top, green patches in the middle etc.) If the user does not fix any patch at node i, the local evidence at each image node may be defined as:

$$p(y_i \mid x_i = l) \propto \exp\left(-\frac{(m(y_i) - m(l))^2}{\sigma_c^2}\right) \tag{13}$$

In this example m(·) may represent the mean color of the argument, and $\sigma_e$ may control how strong a constraint this local evidence term is. Essentially, the local evidence term may ensure that the patch placed at node i has a color similar to the original patch $y_i$. When reconstructing an image with the modified local evidence, the belief propagation algorithm may faithfully reproduce the original image in most parts of the image. The reconstructed image, however, may in some cases contain repeating artifacts. In this example, many of the local minima in the objective function have disappeared with the introduction of the local evidence term. Even with random initialization of messages, belief propagation falls into only few local minima. Additionally, it may take fewer iterations to converge to a solution compared with the case without the local evidence term. In one example, a solution on an image with 192 patches took approximately 100 message updates to converge when it included the local evidence term, as compared to 300 messages for a solution that did not include the local evidence term.

The message passing scheme incorporating the exclusion term has been tested to solve the jigsaw puzzle problem. In many cases, belief propagation can reconstruct the original image, even with random initialization of messages, showing that the image model has a wide peak around the maximum. The number of message passing iterations may in some embodiments be reduced because the factor node essentially provides a short cut for messages to propagate from one end of the image to the other. A notable issue with the exclusion term is that when one patch is only weakly favored over others, the exclusion term may lack the power to suppress the patch reuse. However, for reconstructing the original image, and in the image editing applications described below, the patch reuse rarely causes visual artifacts. In fact, patch reuse is desirable in some applications, such as in object removal and texture manipulation.

Figure 3A:
FIGS. 3A-3D illustrate an image editing operation that uses a patch transform to move an object in an image, according to one embodiment.
Figure 3B:
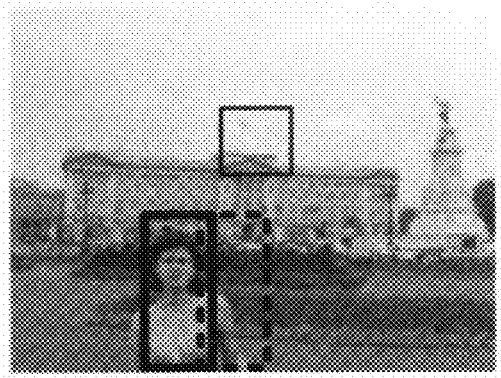

A number of image editing applications may leverage the flexibility of the patch transform, in different embodiments. For example, a user may want to change the location of an object after capturing the picture. An image editing example for relocating a person is illustrated in FIGS. 3A-3D. In this example, FIG. 3A is the original image, and the user wants to move the woman to the center of the image. FIG. 3B illustrates how the user may specify the input, according to one embodiment. In this example, the user grabs (e.g., selects through a GUI operation) patches that belong to the woman (shown as the thick, solid black bounding box), and snaps them to the desired location (shown as the thick dotted bounding box.) The local evidence $p(y_i|x_i)$ in image nodes where the woman used to stand are now uniform over all $x_i$ since the inverse patch transform doesn't know a priori what to place there. In this example, the user has also selected patches to protect (shown as the thin solid black bounding box). These patches will remain fixed during the reconstruction of the image.

Figure 3C:
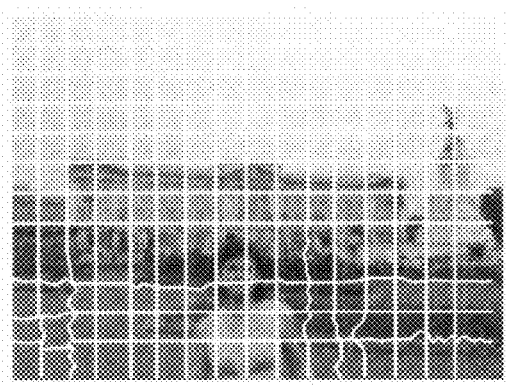
Figure 3D:
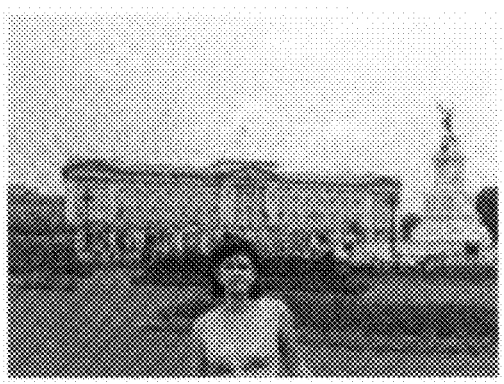

With this user input, the inverse patch transform finds the patch configuration, and the reconstructed image. FIG. 3C illustrates the reconstructed image including seams. Note that a straight seam indicates that two patches on either side of it were adjacent in the original image. If two patches were not adjacent in the original image, the algorithm will find the seam that will minimize visible artifacts. The output image, after suppressing any seam artifacts using Poisson blending is shown in FIG. 3D.

Figure 4A:
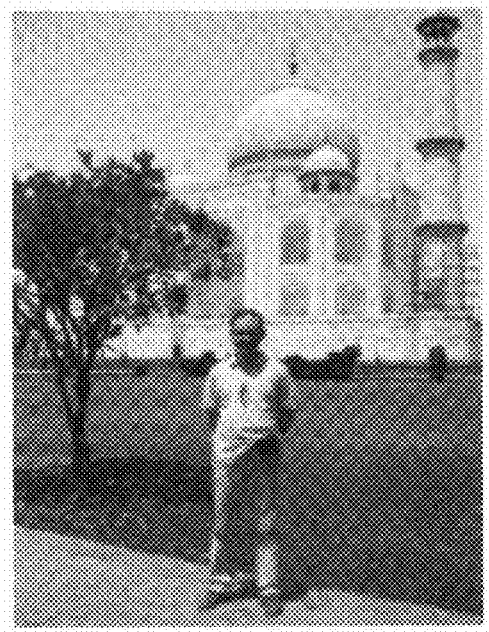
FIGS. 4A-4D illustrate an image editing operation that uses a patch transform to remove an object from an image, according to one embodiment.
Figure 4B:
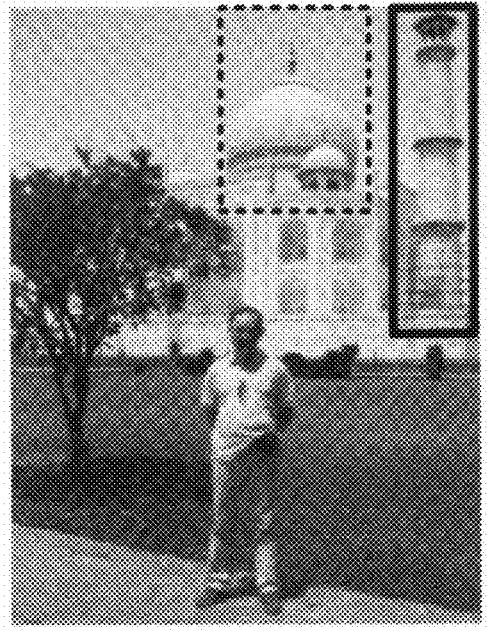
Figure 4C:
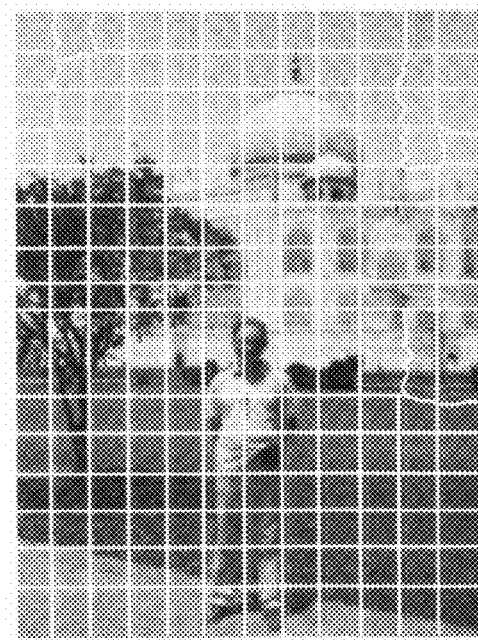

In some embodiments, the patch transform may be used to remove objects, as illustrated in FIGS. 4A-4C. In this example, the user may simply remove patches that belong to the object of interest, and reconstruct the image with the reduced set of patches. Since the exclusion term is not a hard constraint, the inverse patch transform may judiciously reuse some patches. The input image is illustrated in FIG. 4A. In this example, the user wants to remove the long tower under construction (shown as selected using the solid black bounding box in FIG. 4B) while keeping the dome (shown selected using the dotted black bounding box) at its current location.

Figure 4D:
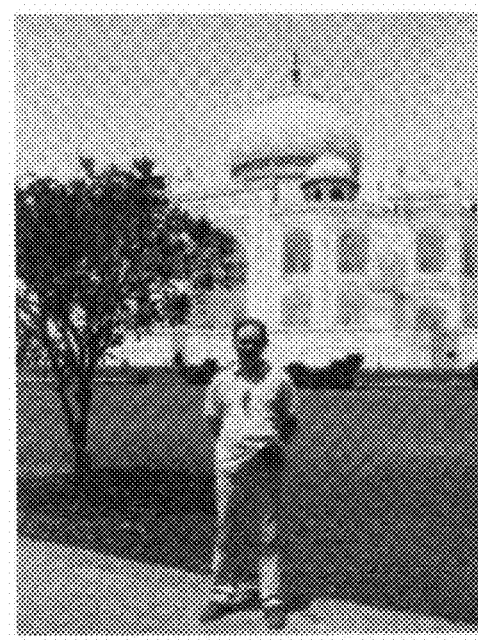

To complete the missing region, the inverse patch transform reuses some patches from the building to propagate it. FIG. 4C illustrates the reconstructed image including seams, and FIG. 4D illustrates the final output image.

A user may be interested in resizing an image while keeping as much content of the original image as possible. One method for retarget an image is "seam carving." In seam carving, the method may find a seam along which the energy is minimum, and may remove the seam from the image. While this method may achieve excellent results on many images, the algorithm is inherently based on low-level cues, and may sometimes fails to retain the overall structure of the image. In some embodiments, the patch transform may allow users to resize an image while keeping the structure of the image through the local evidence term. An image retargeting operation in the patch transform framework may be thought of as solving a jigsaw puzzle on a smaller palette (e.g., leaving some patches unused.) The local evidence on the smaller palette may in some embodiments be the low resolution version of the resized image.

Figure 5A:
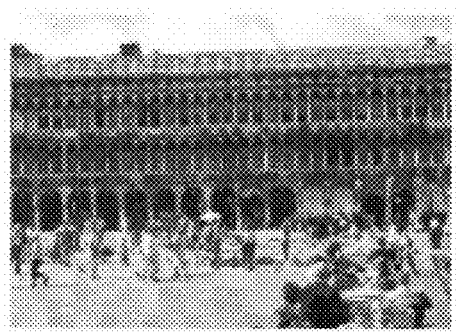
FIGS. 5A-5D illustrate an image editing operation that uses a patch transform to resize an image, according to one embodiment.
Figure 5B:
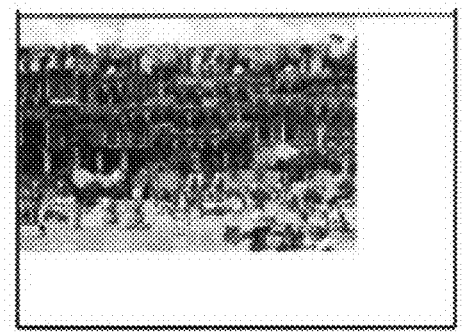
Figure 5C:
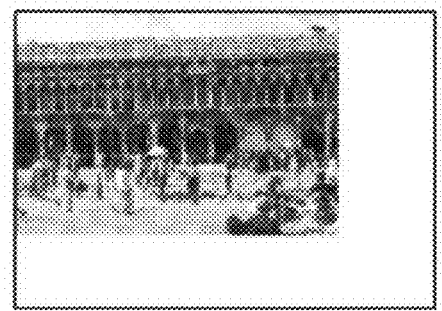
Figure 5D:
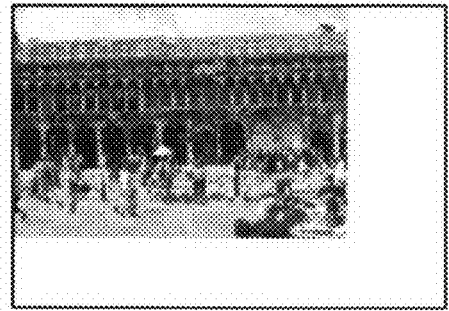

In the example illustrated in FIGS. 5A-5D, the user wants to reduce the image size to be 80% of the original height and width. The input image is shown in FIG. 5A. In this example, the patch assignment solely based on the local evidence results in the image shown in FIG. 5B. While the image does not look like the original image, the overall structure of the original image is maintained. After running belief propagation on the smaller palette, the image shown in FIG. 5D may be generated. FIG. 5C (which illustrates the reconstructed image with overlaid seams) may be examined to see which patches have been removed. For example, a whole floor of the building has been removed to fit the vertical size of the image, and some pillars have been removed to fit the lateral size of the image. In addition, some pavement patches as well as some people have disappeared. In some embodiments, retargeting works well in the patch transform framework because while the compatibility term may try to simply crop the original image, the local evidence term may compete against it to retain as much information as possible. The inverse patch transform may balance these competing interests to generate a retargeted image.

The patch transform may also be well suited to controlling the amount of textures, or the patch statistics, in an image. One method of manipulating the patch statistics is through an explicit control of the patches at hand (as described above.) Another method to control the patch statistics may include manipulating $p(x_i)$ in the image model (Eq. (3).)

In one example, an image includes clouds in the sky and the user wants to have more clouds, e.g., clouds similar to those in a given patch $x_s$, in the output image. The patch preference information may be folded into the $p(x_i)$ model as a constant:

$$p(x_i; x_s) \propto \exp\left(-\frac{(f(x_i) - f(x_s))^2}{2\sigma_{sp}^2}\right) \quad (14)$$

In this example, $\sigma_{sp}$ may represent a specificity parameter, and $f(\cdot)$ may represent a function that captures the characteristic of the argument. In one embodiment, $f(\cdot)$ may represent the mean color of the argument, while in other embodiments it may be defined differently for different applications. In the reconstructed image, with $\sigma_{sp}=0.2$, cloud patches may be used multiple times, and the energy penalty paid for using these patches multiple times may be compensated by the energy preference specified by the prior Eq. (14). In another example, the user may favor sky patches. In this case, the inverse patch transform may reconstruct an image primarily with sky regions. In some embodiments, manipulating $p(x_i)$ may introduce a few local minima, so the inverse patch transform may need to be run a few times to find a plausible image. Nevertheless, in these examples, all local minima may include more cloud or sky patches than the original image, respectively.

In some embodiments, a photomontage application may allow a user to mix patches from multiple images to generate a single image. For example, a photographer may find it hard to capture a person and a desired background at the same time at a given shooting position. In this case, the user may take multiple shots using different lenses or zooms, and combine them in the patch domain. For example, to transfer a large mountain from a first image to the background of a second image, the user may specify which portion of the first image should be placed in the background of the second image, and what region(s) should remain fixed in the second image. The inverse patch transform may reconstruct a plausible image using patches from both images.

The inverse patch transform may in various embodiments be insensitive to the exact size of the bounding box. A general guideline for choosing the bounding box size may be dependent on the user's goals. For example, if the user is interested in generating a visually pleasing image in a small number of BP iterations, the user should fix as many patches as possible to the palette. On the other hand, if the user is interested in exploring a large number of possible patch configurations that will meet their constraints, the user should fix as few patches as possible.

In some embodiments, a multi-scale patch transform may address issues of patch misalignment. In such embodiments, reducing the patch size may increase the number of patches, as well as number of image nodes in the MRF. In such embodiments $p(x)$ may have more local minima as the number of image nodes increases, and the complexity of belief propagation may increase as the cube of the number of patches. With a multi-scale patch transform, the methods may include completing a first reconstructed image using large patches (i.e., a coarser resolution), and then using this reconstructed image as the local evidence for a patch transform at a finer resolution. Since the first reconstructed image has been completed respecting the user input, the reconstructed image from the coarser scale may be highly trusted at the finer scale, leading to fewer BP iterations at the finer scale.

One possible type of visual artifact in a reconstructed image is a structural alignment error. In other words, even when the stitching algorithm finds the seam that minimizes artifacts, it may be hard to eliminate artifacts if there is a structural misalignment between patches. In some embodiments, such artifacts may be repaired under the direction of a user, and may employ a multi-scale patch transform, as described above. While the multi-scale patch transform may suppress artifacts due to large patch sizes, it may take an unreasonable amount of time to reconstruct an image using small patches. To address that, in some embodiments, the multi-scale patch transform technique may be applied in conjunction with user input. For example, each patch at a coarser scale may be broken up into four children patches at the finer scale. In such embodiments, the user may specify one or more regions that contain artifacts, and the algorithm may repair the image using the smaller patches only within the user-specified regions. For example, the method may include performing a patch transform to generate an output image using large patches. The user may then specify the region or regions having visual artifacts (e.g., by selecting them through a graphical user interface). The method may then include re-running belief propagation within the selected region(s) using smaller patches while leaving all patches other than those in the region(s) specified by the user unmodified and fixed in place. Since most of the patches may be fixed in place and repair patch assignment may be performed locally, the required computation time may be much less than if the inverse patch transform were run with small patches in the first place (e.g., on the entire image).

Figure 6A:
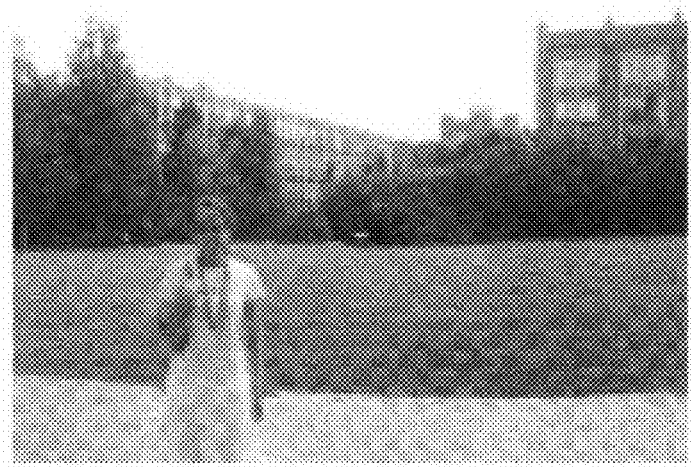
FIGS. 6A-6D illustrate visual artifacts in an output image, according to one embodiment.
Figure 6B:
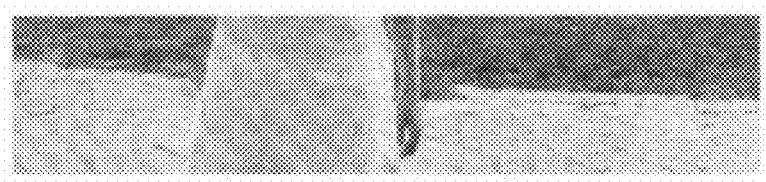

In many cases, the algorithm described above may be used to repair most, if not all, artifacts. However, in other cases the algorithm may be unsuccessful in repairing artifacts. One example is illustrated in FIG. 6A. FIG. 6A depicts a reconstructed image following a modification of the image shown in FIG. 1A. In this example, the woman in FIG. 1A has been moved to a different location in the image in response to user input, and the output image illustrated in FIG. 6A was generated using the patch transform techniques described herein. FIG. 6B depicts a close-up view of a portion of the reconstructed output image shown in FIG. 6A. As shown in FIG. 6B, there are structural misalignments at the boundary between the sidewalk and the grass in the reconstructed output image.

In some embodiments, such visual artifacts may be repaired using a method to "jitter" the assigned patches at various nodes in the output image. As used herein, "jittering a patch" refers to an operation in which one or more boundaries of the patch (e.g., the top edge, bottom edge, right edge, and/or left edge) are shifted by a small number of pixels. Jittering a patch may result in more compatible pixels being located at the edges of the jittered version of the patch. Jittering patches to repair artifacts may in various embodiments be effective when there are sub-patch size structural misalignments, as in the example illustrated in FIGS. 6A and 6B. The method may include breaking down the rigidity implicitly imposed by the underlying grid. In some embodiments (e.g., those in which the patches overlap, as described above), patches may be jittered without generating a hole in the image. The maximum amount of possible jitter may in various embodiments be dependent on the amount of overlap between neighboring patches. For example, in some embodiments, when there is p pixel overlap between adjacent patches, each patch may be jittered by up to p/2 pixels in the top, down, left, and/or right directions without generating a hole in the image.

Figure 6C:
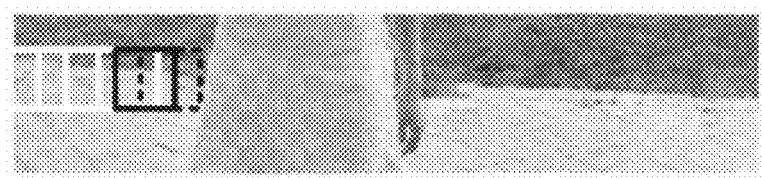

A method for repairing artifacts by jittering patches may include finding patches that have high seam energies with their neighbors (e.g., seams shared between neighbor patches and along which neighbor patches are least compatible), and jittering them one by one. This operation is illustrated by the example shown in FIG. 6C. In this example, the white overlapping squares denote the underlying patch grid, and the patch to be jittered is outlined in solid black. Notice that this patch perfectly matches the patch on the left, in this example. By jittering the patch to the right (shown as the dotted black line), the jittered patch will better fit the patch on its right. In this example, the "dip" between the pre jittered patch and the white dress will disappear. Since the patch has a lateral structure, even if the jittered patch slides to the right, the increase in the seam energy between this patch and the patch on the left will not be drastic. In various embodiments, this approach may be used to adaptively allocate pixels near the edges of the patches to an overlap region (e.g., along one side of the patch) in order to repair visual artifacts.

Figure 6D:
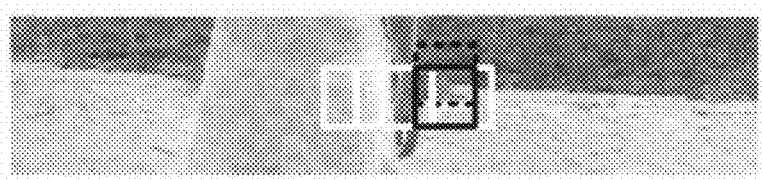

However, jittering each patch one by one may have limitations. In the example illustrated by FIG. 6D, if the patch outlined in solid black is jittered upward, the patch would better fit the patch on its right. However, this would cause a misalignment of the jittered patch with the patch on its left. This may result in a net increase in the seam energy between the jittered patch and its neighbor. In this example, a local jittering scheme may not be able to fix the misalignment. Such a problem may be circumvented in embodiments in which neighboring patches may be jittered based on how a first, or reference, patch (e.g., the patch outlined in solid black, in this example) is jittered.

Instead of locally jittering each patch, one at a time, in some embodiments all patches may be globally jittered at the same time. One way to globally jitter all patches may be to use an MRF. In such embodiments, after initially assigning the patch labels at each node of an output image, as described above, another MRF may be formulated in which the state labels at each node represent a set of candidate patches that includes one or more jittered versions of the initially assigned patch (i.e., the patch assigned in the reconstructed output). In some embodiments, belief propagation may be re-run using only those patch labels (i.e., the labels corresponding to the jittered versions of the initially assigned patches) to produce a refined output image.

This approach, however, may result in a situation in which the number of patch labels per output node explodes. In embodiments having patches with p pixel overlap, if the patches were allowed to shift by up to p/2 pixels in the horizontal and/or vertical directions, there would be $p^2$ possible translations (i.e., $p^2$ different jittered patch versions) for each initially assigned patch. For example, if p were 16, there would be 256 different patch candidates per node. To exacerbate things, the compatibility between each candidate patch at a given node and all possible candidate patches for four neighboring nodes would need to be determined. Note that in some embodiments, some or all of the candidate patches for the four neighboring nodes may be distinct from those of the given node and from each other. In other words, the method may need to compute the seam energy as many as N x 4×$p^2$ x $p^2$ times, where N is the number of image nodes in the output image. In one embodiment, if computing the seam energy for initially assigned patches $N^2$ ($\approx 3 \times 10^6$) times takes about 45 minutes, computing the seam energy for all possible jittered versions of these patches N x 4×$p^2$ x $p^2$ ($\approx 453 \times 10^6$) times may take a prohibitively long time.

In some embodiments, the number of candidate patches considered for each node of the output image (and, thus, the number of seam energy computations required) may be reduced by performing jittering only by particular numbers of pixels. For example, if p=16, the maximum amount of jitter allowed in any direction may be 8 pixels. In one embodiment, jittering may only be allowed in steps of [−6, −3, 0, 3, 6] pixels in the horizontal and/or vertical directions. In this example, this would reduce the number of computations from $453 \times 10^6$ to $4.32 \times 10^6$, but it may still take about 45 minutes to perform the computations. The use of a method to detect a region in which to jitter the patches (e.g., to detect a region containing structural misalignments that may be corrected using patch jittering) may further reduce the computations needed, but may be difficult to implement. Therefore, in some embodiments, user input may be used to steer the application of patch jittering. In other embodiments, jittering operations may be performed on various regions of an image in turn (e.g., using a sliding window), and/or in parallel.

In embodiments of a jittering method that includes user input, the user may be able to mark one or more regions of an output image (e.g., using a GUI) to select portions of the image on which to apply patch jittering (e.g., for improved visual quality). Using the example above, if a user selects only 10 percent of the output image for application of a correction operation using patch jittering, it may take only one-tenth as long (i.e., about 4.5 minutes) to compute the compatibility between all possible combinations of the allowed jittered versions of the initially assigned patches. In this example, the time to re-run belief propagation may be negligible since there would be only 25 labels associated with each of about 10 percent of the patches of the entire image. In addition, by taking advantage of the symmetry between left-right (LR) seam energy and right-left (RL) seam energy, the seam energy computation time may be reduced by about half. In many cases, a user may wish to jitter less than 10 percent of a given output image, which would further reduce the seam energy computation time.

A method for performing patch jittering may include the following operations:

1) Selecting one or more regions of an image (e.g., an output image reconstructed following a patch-based image editing operation) in which to apply patch jittering (e.g., regions containing one or more visual artifacts). Note that selection of the region(s) may be dependent on user input, as described above, or may be determined programmatically (e.g., using a sliding window), in different embodiments.
2) Computing the compatibility between each candidate patch and the candidate patches in its neighborhood (e.g., the candidate patches for adjacent nodes) for all possible, or allowed, jittered versions of the patches in the region(s). Note that the number of jittered versions considered by the patch jittering operation may in some embodiments be configurable (e.g., programmatically determined dependent on the amount of overlap between patches and/or through user input), while in others it may be a fixed or default number.
3) Formulating an MRF in which the state variable at each node represents the amount of jitter in the x and/or y directions. The MRF may be formed only on nodes in the selected region(s). Note that the amount of jitter exhibited by each of the jittered versions may in some embodiments be configurable (e.g., programmatically determined dependent on the amount of overlap between patches and/or through user input), while in others it may be fixed (e.g., according to a pre-determined policy).
4) Running belief propagation to determine the optimal amount of jitter at each node. In other words, for each image node, use BP to assign a version of one of the candidate patches (e.g., the initially assigned version from the reconstructed output image, or one of the jittered versions) for which the joint probability computation yields the highest compatibility for the nodes in the selected region(s).

Figure 7:
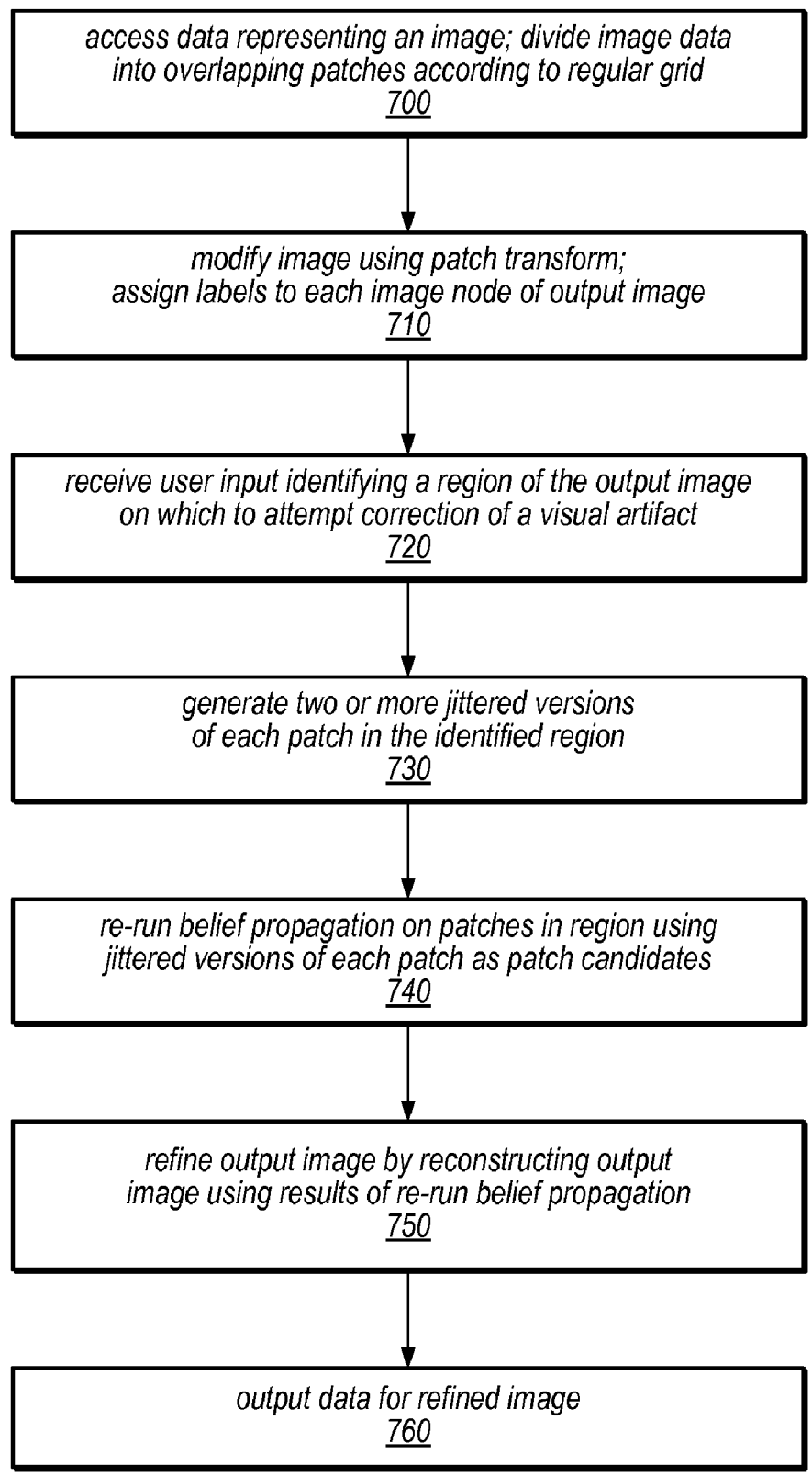
FIG. 7 is a flow diagram illustrating a method for correcting visual artifacts in user-selected regions of an image using patch jittering, according to one embodiment.

A method for performing image correction using patch jittering is illustrated in FIG. 7, according to one embodiment. In this example, data representing an image may be accessed, and may be divided into overlapping patches, as described herein. This is shown at 700. The method may include modifying the image using a patch transform, as in 710. For example, a user may provide input indicating that the image should be resized, or that one or more objects in the image should be resized, relocated, or removed. In this example, such a modification may be implemented by adding one or more patches to the image, relocating one or more patches within the image, removing one or more patches from the image, filling a hole in the image by resizing and/or relocating a patch, or by performing a similar patch-based editing operation. As shown in 710, an output image may be produced by the patch transform and corresponding patch labels may be assigned to each node of the reconstructed output image. In some embodiments, the performing the patch transform may include pre-computing list of candidate patches for each output node (e.g., pruning the list of all patches of the input image, as described above).

In the example illustrated in FIG. 7, the method may include receiving user input identifying a region of the output image on which to attempt correction of a visual artifact, as, in 720. For example, a user may select (using one of various selection tools of a graphical user interface) a region in which a structural misalignment is visible in the output image. The method may include generating two or more jittered versions of each of the patches in the identified region, as in 730. In some embodiments, the method may also include generating jittered versions of neighboring patches (e.g., patches immediately adjacent to the patches of the identified region). In various embodiments, data representing the jittered versions of the patches may be stored in memory (e.g., in a data structure configured for storing such data). Note also that in various embodiments, one or more jittered versions of some or all of the patches of an image may be automatically pre-computed (or may be pre-computed in response to user input) prior to performing any image editing operations, prior to invocation of a correction operation that include the application of patch jittering, in response to an image being loaded in an image editing application, in response to an image being divided into patches, in response to performance of an image editing operation, in response to invocation of an automated correction function, or at another time.

In this example, the method may include re-running belief propagation on the patches of the identified region, using the initially assigned and jittered versions of each patch (and/or the original and jittered versions of their neighbors) as patch candidates for that patch. This is shown as 740. The method may include refining the reconstructed output image using the results of the re-run belief propagation, as in 750. In other words, in some embodiments a refined output image may be produced that includes one or more jittered patches in place of previously assigned versions of those patches or of neighboring patches. The method may then output data for the refined image, as in 760. For example, the data may be provided to a display component of the image editing application for display of the refined output image to the user and/or the data may be stored as in intermediate image by the image editing application for further processing by the application (or another application) or as a final image (e.g., written to main memory, a file, an archive, etc.). Note that in some embodiments, the boundary nodes in the MRF may receive messages from neighbors that are not included in the identified region, assuming that those patches are not replaced with jittered versions thereof.

As noted above, performing patch jittering by re-running BP on an entire image may be too expensive and/or time-consuming to be practical (e.g., in the context of user-interactive graphics applications). However, because the re-run computations may depend on only a few local patch candidates for each image node, in some embodiments, patch jittering may be performed on an entire image by dividing up the computations and executing them off-line and/or in parallel. In some embodiments, rather than performing patch jittering in a region of an image specified by a user, the methods described herein may be automatically applied to each of a plurality of image regions, e.g., in a sliding window. For example, in one embodiment, patch jittering may be applied in a sliding window of 10×10 nodes across the initial output image. In some embodiments, patch jittering in two or more of the sliding window positions may be performed in parallel, e.g., by separate threads on a multi-core processor or GPU. The results may then be combined to reconstruct a refined output image.

Figure 8:
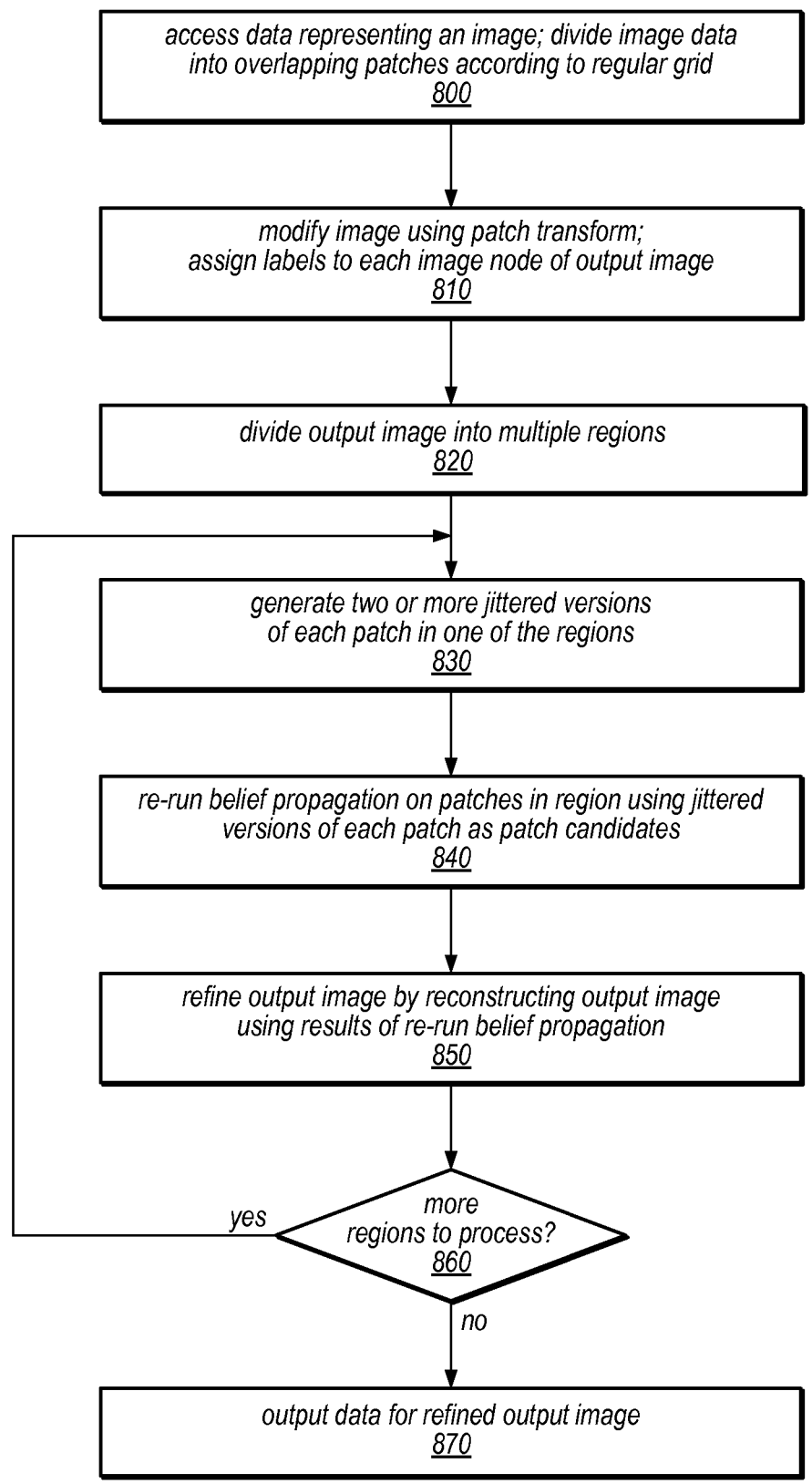
FIG. 8 is a flow diagram illustrating a method for correcting visual artifacts in multiple regions of an image using patch jittering, according to one embodiment.

FIG. 8 is a flow diagram illustrating one method for applying patch jittering across an entire image. In this example, data representing an image may be accessed, and may be divided into overlapping patches, as described herein. This is shown at 800. The method may include modifying the image using a patch transform, as in 810. For example, the image may be resized, one or more objects in the image may be moved or removed, etc. As shown in 810, an output image may be produced by the patch transform and labels may be assigned to each node of the output image.

In the example illustrated in FIG. 8, the method may include dividing the output image into a plurality of overlapping regions, as in 820. For example, in one embodiment, the output image may be divided into overlapping regions of 10×10 nodes, while in another embodiment, the output image may be divided into horizontal and/or vertical strips of nodes. The method may include generating two or more jittered versions of each of the patches in one of the regions, as in 830. In various embodiments, data representing the jittered versions of the patches may be stored in memory (e.g., in a data structure configured for storing such data). As previously noted, in some embodiments, the method may also include generating jittered versions of neighboring patches (e.g., patches immediately adjacent to the patches of the identified region).

In the example illustrated in FIG. 8, the method may include re-running belief propagation on the patches of the given region, using the jittered versions of the patches (and/or their neighbors) as patch candidates. This is shown as 840. The method may include refining the output image by reconstructing the output image using the results of the re-run belief propagation, as in 850. In other words, the output image may be reconstructed using one or more jittered patches in place of one or more previously assigned versions of those patches or of neighboring patches, in some embodiments. If there are more regions to be processed, shown as the positive exit from 860, the method may include repeating the operations shown as 830-850 until all of the regions have been processed. For example, in one embodiment, the regions may be processed in order from top-left to bottom-right as a sliding window traverses the regions. Note that in different embodiments, the results of the application of patch jittering in a given region may affect the application of patch jittering in another region (e.g., one that is adjacent to or overlaps the given region). In other words, the patch version that is most compatible with one of its neighbors (which may be included in an adjacent or overlapping region) may depend on which version of a patch was assigned, or re-assigned, to the neighbor during the application of patch jittering in the corresponding region. In this example, once all the image regions have been processed, the method may then output data representing the refined image, as in 870. For example, the data may be provided to a display component of the image editing application for display of the refined output image to the user and/or the data may be stored as in intermediate image by the image editing application for further processing by the application (or another application) or as a final image (e.g., written to main memory, a file, an archive, etc.).

In the example illustrated in FIG. 8, patch jittering is applied in a sliding window across the image one position at a time. However, in other embodiments, application of patch jittering in multiple windows may be performed in parallel. For example, in some embodiments, if an output image is divided into regions of 10×10 pixels or into multiple horizontal or vertical strips, various ones of these regions that do not overlap each other may be processed in parallel (e.g., on different processors).

Figure 9A:
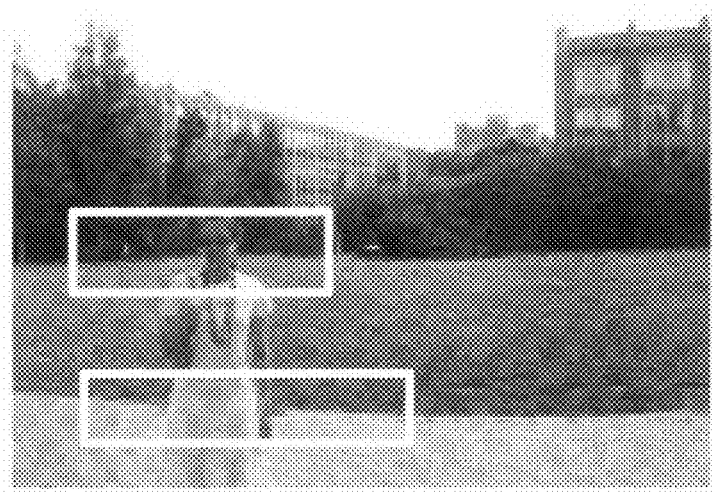
FIGS. 9A-9D illustrate correction of visual artifacts in an output image, according to one embodiment.
Figure 9B:
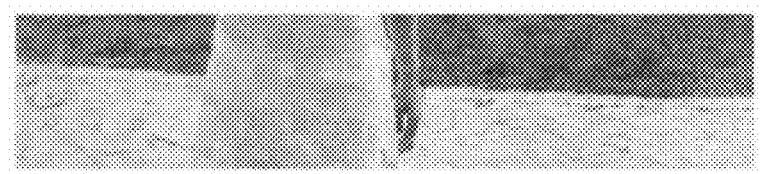
Figure 9C:
Figure 9D:

FIGS. 9A-9D illustrate additional examples of patch jittering of output images. FIG. 9A, for example, illustrates the reconstructed output image shown in FIG. 6A. Two regions that have been selected by a user for patch jittering are outlined in white. The lower of the two regions corresponds to the patch jittering example shown in FIGS. 6B-6C. FIG. 9B illustrates a close-up view of this portion of the image after patch jittering has been applied to correct the misalignments along the sidewalk edge. FIG. 9C illustrates a close-up view of the upper region selected by the user before the application of patch jittering. FIG. 9D illustrates the same region after patch jittering has been applied to correct the misalignments in this region.

Note that, in some embodiments, patch jittering operations may not always yield perfect results. For example, there may be a few local minima in the MRF, since most of the jittered patches are compatible with their neighbors. By randomly initializing the BP messages, some of the local minima may be explored. In the example illustrated in FIG. 9A, with both user inputs, the alignment error in the sidewalk may be correctly perfectly.

Notice that in the example illustrated in FIG. 9B, patch jittering was successfully applied to align the sidewalk behind the woman on her right side. As discussed above, the more difficult problem in this example was correction of the sidewalk alignment error on her left side. To properly align this region all together, the algorithm would have to shift the right segment of the sidewalk up by a "whole" patch to fix the alignment error, which may not be feasible through jittering. The algorithm may try to move one patch from the left segment downward to better align it with the right segment, but this may generate a high energy seam. In another embodiment, local minima may have been able do something smarter by aligning the pavement from the woman's left side all the way to the right end of the pavement. In various embodiments, the output image may be quite insensitive to the specifics of the user input. In other words, different user inputs may be used to generate reasonable outputs by randomly initializing the BP messages.

Figure 10:
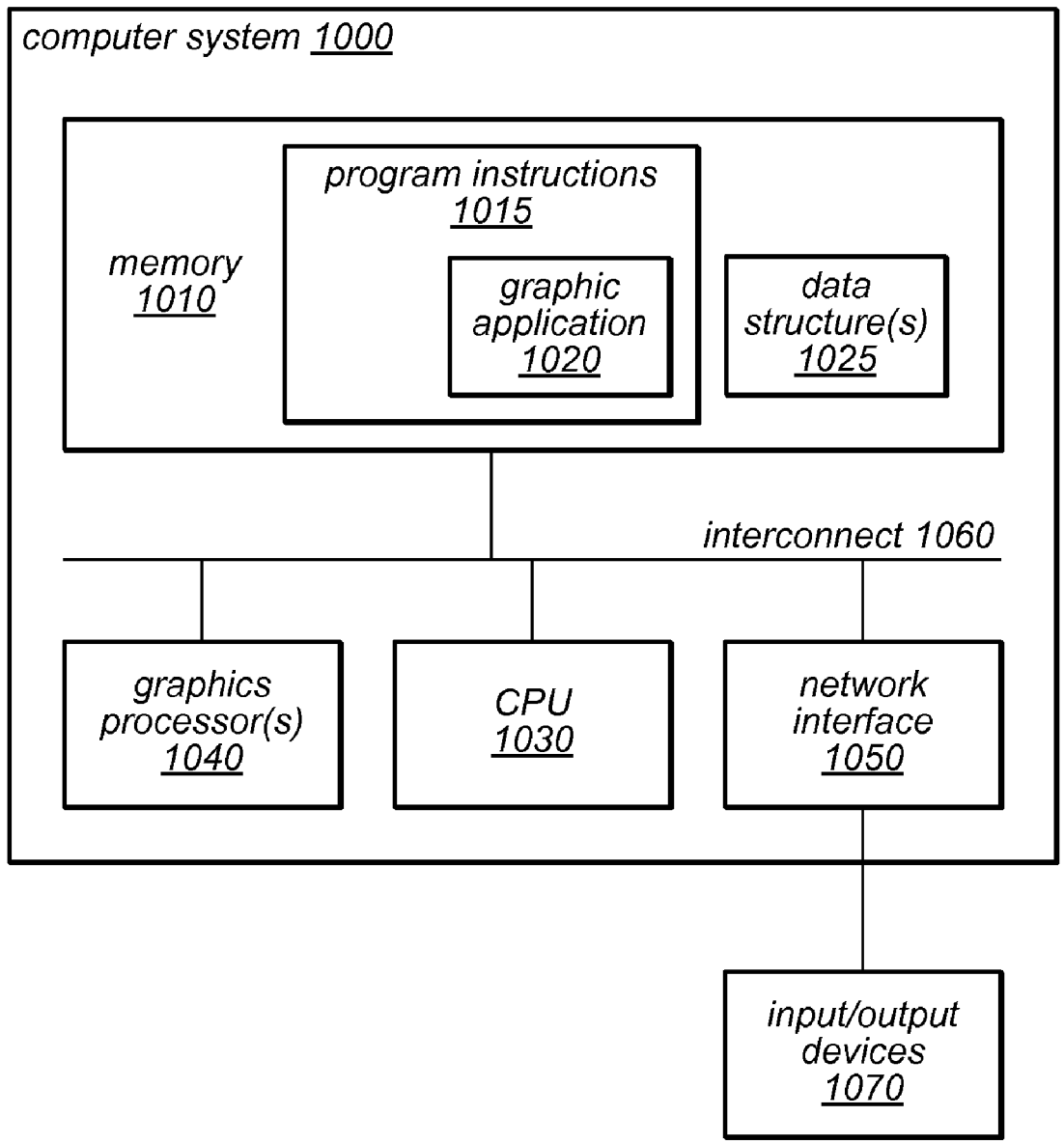
FIG. 10 illustrates a computer system configured for implementing editing of input images using patch transforms and/or refining output images using patch jittering, according to one embodiment.

The methods described herein for jittering of patches in image editing operations (e.g., within a graphics application) may be implemented by a computer system configured to provide the functionality described. FIG. 10 is a block diagram illustrating one embodiment of a computer system 1000 configured to implement such image editing operations. A graphics application such as graphics application 1020 may be configured to perform various image editing functions and to render new images accordingly. In some embodiments, a user may invoke operations to move or remove objects, resize objects or entire images, or otherwise alter an input image through a user interface of graphics application 1020. Graphics application 1020 may be configured to perform these operations using patch transforms, according to various embodiments, and may employ the methods described herein for jittering patches. Graphics application 1020 may be configured to render the reconstructed image to a separate window, or directly into the same frame buffer containing the input image, in different embodiments.

Graphics application 1020 may represent various types of graphics applications, such as painting, publishing, photography, games, animation, and other applications. Additionally, graphics application 1020 may utilize a graphics processor 1040 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them much faster than drawing directly to the screen with a host central processing unit (CPU), such as CPU 1030. In various embodiments, the methods disclosed herein for may be implemented by program instructions configured for parallel execution on two or more such GPUs. The GPU 1000 may implement one or more application programmer interfaces (APIs) that permit programmers to invoke the functionality of the GPU. Suitable GPUs may be commercially available from vendors such as NVIDIA Corporation, ATI Technologies, and others.

Note that functionality and/or features described herein as being part of, or performed by, graphics application 1020 may, in some embodiments, be part of, or performed by, one or more graphics processors, such as graphics processor 1040. As described above, in some embodiments graphics application 1020 may be configured to render modified and/or reconstructed images into a different window than input images.

Editing of images using patch transforms, as described herein, may be implemented on various types of computer systems. Referring again to FIG. 10, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1020, which may be configured to implement patch jittering and/or image operations using patch transforms, as described herein, may be provided as a computer program product, or software, that may include a computer-readable storage medium having stored thereon instructions, which may be used to program a computer system (or other electronic devices) to implement image editing using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 10, computer system 1000 may include one or more processor units (CPUs) 1030. Processors 1030 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1000, such as various versions of Unix, Linux, Windows™ from Microsoft Corporation, MacOS™ from Apple Corporation, or any other operating system that enables the operation of software on a hardware platform.

The computer system 1000 may also include one or more system memories 1010 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1000 via interconnect 1060. Memory 1010 may include other types of memory as well, or combinations thereof. One or more of memories 1010 may include program instructions 1015 executable by one or more of processors 1030 to implement aspects of the image editing techniques described herein. Program instructions 1015, which may include program instructions configured to implement graphics application 1020, may be partly or fully resident within the memory 1010 of computer system 1000 at any point in time. Alternatively, program instructions 1015 may be provided to GPU 1040 for performing image editing operations (or portions thereof) on GPU 1040 using one or more of the techniques described herein. In some embodiments, the techniques described herein may be implemented by a combination of program instructions 1015 executed on one or more processors 1030 and one or more GPUs 1040, respectively. Program instructions 1015 may also be stored on an external storage device (not shown) accessible by the processor(s) 1030 and/or GPU 1040, in some embodiments. Any of a variety of such storage devices may be used to store the program instructions 1015 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1030 and/or GPU 1040 through one or more storage or I/O interfaces including, but not limited to, interconnect 1060 or network interface 1050, as described herein. In some embodiments, the program instructions 1015 may be provided to the computer system 1000 via any suitable computer-readable storage medium including memory 1010 and/or external storage devices described above. Memory 1010 may also be configured to implement one or more data structures 1025, such as one or more data structures for tracking lists of active labels for image nodes and/or structures configured to store data representing jittered versions of patches, one or more input images, output images, intermediate images, and/or refined output images. Data structures 1025 may be accessible by processor(s) 1030 and/or GPU 1040 when executing graphics application 1020 or other program instructions 1015.

As shown in FIG. 10, processor(s) 1030 may be coupled to one or more of the other illustrated components by at least one communications bus, such as interconnect 1060 (e.g., a system bus, LDT, PCI, ISA, or other communication bus type), and a network interface 1050 (e.g., an ATM interface, an Ethernet interface, a Frame Relay interface, or other interface). The CPU 1030, the network interface 1050, and the memory 1010 may be coupled to the interconnect 1060. It should also be noted that one or more components of system 1000 might be located remotely and accessed via a network.

As noted above, in some embodiments, memory 1010 may include program instructions 1015, comprising program instructions configured to implement graphics application 1020, as described herein. Graphics application 1020 may be implemented in various embodiments using any desired programming language, scripting language, or combination of programming languages and/or scripting languages, e.g., C, C++, C#, Java™, Perl, etc. For example, in one embodiment, graphics application 1020 may be JAVA based, while in another embodiments, it may be implemented using the C or C++ programming languages. In other embodiments, graphics application 1020 may be implemented using specific graphic languages specifically for developing programs executed by specialize graphics hardware, such as GPU 1040. In addition, graphics application 1020 may be embodied on memory specifically allocated for use by graphics processor(s) 1040, such as memory on a graphics board including graphics processor(s) 1040. Thus, memory 1010 may represent dedicated graphics memory as well as general-purpose system RAM, in various embodiments. Memory 1010 may in some embodiments also include a data store configured to store image data for one or more input images and/or output images, in various embodiments. Other information not described herein may be included in memory 1010 and may be used to implement the methods described herein and/or other functionality of computer system 1000.

Network interface 1050 may be configured to enable computer system 1000 to communicate with other computers, systems or machines, such as across a network. Network interface 1050 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1000 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1050 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 10, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1040 and the rest of the computer system 1000 may travel through a graphics card slot or other interface, such as interconnect 1060 of FIG. 10.

Computer system 1000 may also include one or more additional I/O interfaces, such as interfaces for one or more user input devices 1070, or such devices may be coupled to computer system 1000 via network interface 1050. For example, computer system 1000 may include interfaces to a keyboard, a mouse or other cursor control device, a joystick, or other user input devices 1070, in various embodiments. Additionally, the computer system 1000 may include one or more displays (not shown), coupled to processors 1030 and/or other components via interconnect 1060 or network interface 1050. Such input/output devices may be configured to allow a user to interact with graphics application 1020 to request or invoke various image editing operations and/or to specify various parameters, thresholds, and/or other configurable options available to the user when editing images while executing graphic application 1020. For example, they may be configured to allow a user to select a region of an image on which to apply patch jittering, to specify a number of jittered versions of each patch to be considered as candidate patches in a correction operation, to specify a number of pixels by which to shift a boundary of a patch to generate a jittered version of the patch, to specify a number of patches into which an image should be divided, a number of pixels to include in a sliding window for application of patch jittering, etc. It will be apparent to those having ordinary skill in the art that computer system 1000 may also include numerous other elements not shown in FIG. 10.

Note that program instructions 1015 may be configured to implement a graphic application 1020 as a stand-alone application, or as a module of another graphics application or graphics library, in various embodiments. For example, in one embodiment program instructions 1015 may be configured to implement graphics applications such as painting, publishing, photography, games, animation, and/or other applications, and may be configured to edit images as part of one or more of these graphics applications. In another embodiment, program instructions 1015 may be configured to implement the image editing techniques described herein in one or more functions called by another graphics application executed on GPU 1040 and/or processor(s) 1030. Program instructions 1015 may also be configured to render images and present them on one or more displays as the output of an image editing operation or visual artifact correction operation and/or to store image data for modified, reconstructed, and/or refined images in memory 1010 and/or an external storage device(s), in various embodiments. For example, a graphics application 1020 included in program instructions 1015 may utilize GPU 1040 when modifying, rendering, or displaying images in some embodiments.

While various image editing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations described herein may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
   one or more processors; and
   a memory coupled to the one or more processors and storing program instructions executable by the one or more processors to implement:
   dividing an input image into a plurality of patches in accordance with a regular grid;
   performing a patch-based image editing operation on the input image to produce an output image, wherein said performing comprises assigning a given one of the plurality of patches to a respective node of the output image;
   producing a refined output image, wherein said producing a refined output image comprises assigning one of a previously generated set of candidate patches to the respective node of the output image, wherein the previously generated set of candidate patches comprises the given patch and one or more jittered versions of the given patch, and wherein each of the one or more jittered versions of the given patch comprises a version of the given patch that has been shifted by a respective number of pixels in one or more directions; and
   outputting data representing the refined output image.

2. The system of claim 1,
   wherein at least some of the plurality of patches are overlapping patches; and
   wherein an amount of jitter exhibited by the one or more jittered versions of the given patch is dependent on an amount of overlap between the given patch and an adjacent patch in the output image.

3. The system of claim 1, wherein said assigning one of a previously generated set of candidate patches to the respective node of the output image comprises assigning the one of the previously generated set of candidate patches most compatible with a patch assigned to an adjacent node of the output image.

4. The system of claim 1, wherein said assigning one of a previously generated set of candidate patches to the respective node of the output image comprises maximizing a joint probability of active label assignments in at least the neighborhood of the respective node using belief propagation.

5. The system of claim 1,
   wherein the respective node of the output image is one of a plurality of nodes in a given portion of the output image; and
   wherein to produce the refined image, the program instructions are further executable to implement:
   for each of at least one other node of the plurality of nodes in the given portion of the output image, assigning one of a previously generated respective set of candidate patches to the node, wherein the previously generated respective set of candidate patches comprises a patch assigned to the node of the output image and one or more jittered versions of the patch assigned to the node of the output image.

6. The system of claim 1,
   wherein the respective node of the output image is one of a plurality of nodes in a given portion of the output image; and
   wherein the program instructions are further executable to implement:
   receiving input identifying the given portion of the output image as a region containing a visual artifact on which to attempt correction.

7. The system of claim 1,
   wherein the respective node of the output image is one of a plurality of nodes in a given portion of the output image;
   wherein the program instructions are further executable to implement:
   dividing the output image into a plurality of regions; and
   wherein the given portion of the output image is one of the plurality of regions.

8. The system of claim 7, wherein to produce the refined image, the program instructions are further executable to implement:
   for at least one node in at least one other one of the plurality of regions of the output image, assigning one of a previously generated respective set of candidate patches to the node, wherein the previously generated respective set of candidate patches for the at least one node comprises a patch assigned to the at least one node and one or more jittered versions of the patch assigned to the at least one node.

9. The system of claim 1,
   wherein the previously generated set of candidate patches comprises one or more other ones of the plurality of patches and one or more jittered versions of each of the one or more other ones of the plurality of patches; and wherein the one or more other ones of the plurality of patches comprises fewer than all of the plurality of patches.

10. The system of claim 1, wherein the program instructions are further executable to implement:

prior to said assigning one of a previously generated set of candidate patches to the respective node of the output image, generating the set of candidate patches, wherein said generating comprises generating one or more jittered versions of at least some of the plurality of patches.

11. The system of claim 1, wherein the previously generated set of candidate patches comprises a configurable number of jittered versions of the given patch.

12. The system of claim 1, wherein the amount of jitter exhibited in each of the one or more jittered versions of the given patch is configurable.

13. The system of claim 1, wherein said performing a patch-based image editing operation on the input image comprises one or more of: adding a patch to the image, relocating a patch within the image, removing a patch from the image, filling a hole in the image resulting from relocation of a patch, or filling a hole in the image resulting from removal of a patch.

14. The system of claim 1, wherein the one or more processors comprise at least one of: a general-purpose central processing unit (CPU) or a graphics processing unit (GPU).

15. A non-transitory computer-readable storage medium, storing program instructions computer-executable to implement:

dividing an input image into a plurality of patches in accordance with a regular grid;

performing a patch-based image editing operation on the input image to produce an output image, wherein said performing comprises assigning a given one of the plurality of patches to a respective node of the output image;

producing a refined output image, wherein said producing a refined output image comprises assigning one of a previously generated set of candidate patches to the respective node of the output image, wherein the previously generated set of candidate patches comprises the given patch and one or more jittered versions of the given patch, and wherein each of the one or more jittered versions of the given patch comprises a version of the given patch that has been shifted by a respective number of pixels in one or more directions; and outputting data representing the refined output image.

16. The storage medium of claim 15, wherein at least some of the plurality of patches are overlapping patches; and wherein an amount of jitter exhibited by the one or more jittered versions of the given patch is dependent on an amount of overlap between the given patch and an adjacent patch in the output image.

17. The storage medium of claim 15, wherein said assigning one of a previously generated set of candidate patches to the respective node of the output image comprises assigning the one of the previously generated set of candidate patches most compatible with a patch assigned to an adjacent node of the output image.

18. The storage medium of claim 15, wherein said assigning one of a previously generated set of candidate patches to the respective node of the output image comprises maximizing a joint probability of active label assignments in at least the neighborhood of the respective node using belief propagation.

19. The storage medium of claim 15, wherein the respective node of the output image is one of a plurality of nodes in a given portion of the output image; and wherein to produce the refined image, the program instructions are further executable to implement:

for each of at least one other node of the plurality of nodes in the given portion of the output image, assigning one of a previously generated respective set of candidate patches to the node, wherein the previously generated respective set of candidate patches comprises a patch assigned to the node of the output image and one or more jittered versions of the patch assigned to the node of the output image.

20. The storage medium of claim 15, wherein the respective node of the output image is one of a plurality of nodes in a given portion of the output image; and wherein the program instructions are further executable to implement:

receiving input identifying the given portion of the output image as a region containing a visual artifact on which to attempt correction.

21. The storage medium of claim 15, wherein the respective node of the output image is one of a plurality of nodes in a given portion of the output image;

wherein the program instructions are further executable to implement:

dividing the output image into a plurality of regions; and wherein the given portion of the output image is one of the plurality of regions.

22. The storage medium of claim 21, wherein to produce the refined image, the program instructions are further executable to implement:

for at least one node in at least one other one of the plurality of regions of the output image, assigning one of a previously generated respective set of candidate patches to the node, wherein the previously generated respective set of candidate patches for the at least one node comprises a patch assigned to the at least one node and one or more jittered versions of the patch assigned to the at least one node.

23. The storage medium of claim 15, wherein the previously generated set of candidate patches comprises one or more other ones of the plurality of patches and one or more jittered versions of each of the one or more other ones of the plurality of patches; and wherein the one or more other ones of the plurality of patches comprises fewer than all of the plurality of patches.

24. The storage medium of claim 15, wherein the program instructions are further executable to implement:

generating one or more jittered versions of at least some of the plurality of patches.

25. The storage medium of claim 15, wherein the previously generated set of candidate patches comprises a configurable number of jittered versions of the given patch.

26. The storage medium of claim 15, wherein the amount of jitter exhibited in each of the one or more jittered versions of the given patch is configurable.

27. The storage medium of claim 15, wherein said performing a patch-based image editing operation on the input image comprises one or more of: adding a patch to the image, relocating a patch within the image, removing a patch from the image, filling a hole in the image resulting from relocation of a patch, or filling a hole in the image resulting from removal of a patch.

28. A computer-implemented method, comprising:
- dividing an input image into a plurality of patches in accordance with a regular grid;
- performing a patch-based image editing operation on the input image to produce an output image, wherein said performing comprises assigning a given one of the plurality of patches to a respective node of the output image;
- producing a refined output image, wherein said producing a refined output image comprises assigning one of a previously generated set of candidate patches to the respective node of the output image, wherein the previously generated set of candidate patches comprises the given patch and one or more jittered versions of the given patch, and wherein each of the one or more jittered versions of the given patch comprises a version of the given patch that has been shifted by a respective number of pixels in one or more directions; and
- outputting data representing the refined output image.

29. The method of claim 28,
- wherein at least some of the plurality of patches are overlapping patches; and
- wherein an amount of jitter exhibited by the one or more jittered versions of the given patch is dependent on an amount of overlap between the given patch and an adjacent patch in the output image.

30. The method of claim 28, wherein said assigning one of a previously generated set of candidate patches to the respective node of the output image comprises assigning the one of the previously generated set of candidate patches most compatible with a patch assigned to an adjacent node of the output image.

31. The method of claim 28, wherein said assigning one of a previously generated set of candidate patches to the respective node of the output image comprises maximizing a joint probability of active label assignments in at least the neighborhood of the respective node using belief propagation.

32. The method of claim 28,
- wherein the respective node of the output image is one of a plurality of nodes in a given portion of the output image; and
- wherein to produce the refined image, the program instructions are further executable to implement:
  - for each of at least one other node of the plurality of nodes in the given portion of the output image, assigning one of a previously generated respective set of candidate patches to the node, wherein the previously generated respective set of candidate patches comprises a patch assigned to the node of the output image and one or more jittered versions of the patch assigned to the node of the output image.

33. The method of claim 28,
- wherein the respective node of the output image is one of a plurality of nodes in a given portion of the output image; and
- wherein the program instructions are further executable to implement:
  - receiving input identifying the given portion of the output image as a region containing a visual artifact on which to attempt correction.

34. The method of claim 28,
- wherein the respective node of the output image is one of a plurality of nodes in a given portion of the output image;
- wherein the program instructions are further executable to implement:
  - dividing the output image into a plurality of regions; and
- wherein the given portion of the output image is one of the plurality of regions.

35. The method of claim 34, wherein to produce the refined image, the program instructions are further executable to implement:
- for at least one node in at least one other one of the plurality of regions of the output image, assigning one of a previously generated respective set of candidate patches to the node, wherein the previously generated respective set of candidate patches for the at least one node comprises a patch assigned to the at least one node and one or more jittered versions of the patch assigned to the at least one node.

36. The method of claim 28,
- wherein the previously generated set of candidate patches comprises one or more other ones of the plurality of patches and one or more jittered versions of each of the one or more other ones of the plurality of patches; and
- wherein the one or more other ones of the plurality of patches comprises fewer than all of the plurality of patches.

37. The method of claim 28, wherein the program instructions are further executable to implement:
- generating one or more jittered versions of at least some of the plurality of patches.

38. A computer-implemented method, comprising:
- executing instructions on a specific apparatus so that binary digital electronic signals representing an input image are grouped into a plurality of collections of signals, each collection of signals representing one of a plurality of patches of the input image in accordance with a regular grid;
- executing instructions on said specific apparatus so that a patch-based image editing operation is performed on the binary digital electronic signals representing the input image to produce binary digital electronic signals representing an output image, and so that binary digital electronic signals representing a label associated with a given one of the plurality of patches are associated with a respective node of the output image;
- executing instructions on said specific apparatus so that binary digital electronic signals representing a refined output image are generated, and so that binary digital electronic signals representing a label associated with one of a previously generated set of candidate patches are associated with a node in the refined output image corresponding to the respective node in the output image, wherein the previously generated set of candidate patches comprises binary digital electronic signals representing the given patch and binary digital electronic signals representing one or more jittered versions of the given patch, and wherein each of the one or more jittered versions of the given patch comprises a version of the given patch that has been shifted by a respective number of pixels in one or more directions; and
- storing binary digital electronic signals representing the refined output image in a memory location of said specific apparatus.

* * * * *